(12) United States Patent
Szczerba

(10) Patent No.: US 11,433,938 B2
(45) Date of Patent: Sep. 6, 2022

(54) ADAPTIVE STEERING WHEEL RIM

(71) Applicant: GM GLOBAL TECHNOLOGY OPERATIONS LLC, Detroit, MI (US)

(72) Inventor: Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/123,252

(22) Filed: Dec. 16, 2020

(65) Prior Publication Data

US 2022/0185358 A1  Jun. 16, 2022

(51) Int. Cl.
*B62D 1/06* (2006.01)

(52) U.S. Cl.
CPC ...................... *B62D 1/06* (2013.01)

(58) Field of Classification Search
None
See application file for complete search history.

(56) References Cited

U.S. PATENT DOCUMENTS

| | | | | |
|---|---|---|---|---|
| 5,294,117 A * | 3/1994 | Huang | ............. | A63B 49/08 473/523 |
| 6,382,661 B1 * | 5/2002 | Sutherland | .......... | B60R 21/2032 280/728.2 |
| 8,881,347 B2 * | 11/2014 | Feinstein | ................ | B25F 5/006 16/431 |
| 9,610,977 B2 | 4/2017 | Watanabe et al. | | |
| 10,005,177 B2 * | 6/2018 | Rimatzki | ................ | B62D 1/06 |
| 10,459,475 B2 * | 10/2019 | Gandhi | ................... | G05G 1/06 |
| 10,532,760 B1 * | 1/2020 | Wang | ...................... | B62D 1/08 |
| 10,843,709 B2 | 11/2020 | Ruemelin et al. | | |
| 2004/0025624 A1 | 2/2004 | Kreuzer | | |
| 2005/0043110 A1 * | 2/2005 | Lindsey | ................ | B62K 21/26 473/300 |
| 2010/0282018 A1 * | 11/2010 | Bazinski | ................ | B62D 1/06 74/558 |
| 2011/0133919 A1 * | 6/2011 | Evarts | ..................... | B60Q 9/00 340/439 |
| 2011/0245643 A1 * | 10/2011 | Lisseman | ............... | A61B 5/24 600/372 |

(Continued)

FOREIGN PATENT DOCUMENTS

| | | |
|---|---|---|
| CN | 112407019 A | 2/2021 |
| DE | 19852315 A1 | 5/2000 |

(Continued)

OTHER PUBLICATIONS

Office Action dated Mar. 7, 2022 corresponding to German Patent Application No. 102021114754.9, 10 pages.

(Continued)

*Primary Examiner* — Richard W Ridley
*Assistant Examiner* — Brian J McGovern

(57) ABSTRACT

A steering wheel for a vehicle comprising: i) a hub adapted to be mounted on a steering column of a vehicle; ii) a rim coupled to the hub; iii) a rim material covering at least a part of the rim; iv) at least one bladder disposed between the rim and the rim material; v) a fluid pump configured to inflate and to deflate the at least one bladder; and vi) a control module coupled to at least one vehicle sensor and configured to control the operation of the fluid pump.

17 Claims, 6 Drawing Sheets

(56) References Cited

U.S. PATENT DOCUMENTS

| | | | |
|---|---|---|---|
| 2015/0032334 A1* | 1/2015 | Jang | B60W 10/20 |
| | | | 701/42 |
| 2015/0088357 A1* | 3/2015 | Yopp | B60W 30/00 |
| | | | 701/23 |
| 2016/0083002 A1* | 3/2016 | Lin | B62D 1/10 |
| | | | 74/554 |
| 2016/0159370 A1* | 6/2016 | Muramatsu | B60W 50/14 |
| | | | 701/1 |
| 2016/0159396 A1* | 6/2016 | Watanabe | B62D 1/04 |
| | | | 701/36 |
| 2016/0194022 A1* | 7/2016 | Williams | B62D 1/06 |
| | | | 74/558 |
| 2017/0072966 A1* | 3/2017 | Bolger | B60H 1/00892 |
| 2017/0129335 A1* | 5/2017 | Lu | A61B 5/6803 |
| 2017/0297606 A1* | 10/2017 | Kim | B62D 1/181 |
| 2018/0362111 A1* | 12/2018 | Gulotta | B62K 21/26 |
| 2019/0077311 A1* | 3/2019 | Ali | B32B 9/025 |
| 2019/0202383 A1* | 7/2019 | Odate | B62D 1/06 |
| 2019/0375431 A1* | 12/2019 | Garcia | B62D 1/046 |

FOREIGN PATENT DOCUMENTS

| | | |
|---|---|---|
| DE | 10026627 A1 | 12/2001 |
| DE | 20212398 U1 | 12/2002 |
| DE | 60317179 T2 | 8/2008 |
| DE | 102012011826 B3 | 9/2013 |
| DE | 102015119985 A1 | 6/2016 |
| DE | 102015223688 A1 | 6/2017 |

OTHER PUBLICATIONS

Office Action dated May 6, 2022 corresponding to German Patent Application No. 102021114754.9, 7 pages.

\* cited by examiner

ADAPTIVE STEERING WHEEL RIM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to an adaptive steering wheel grip that may be modified to adapt to: i) user-preferences for customer enthusiasm, ii) driving environment to enhance driving performance, and iii) user-state to promote user-comfort. Steering wheel rim grip size and shape have different requirements for different users and different driving environments. The requirements account for individual differences in user hand size and grip strength, individual preferences in grip feel, rim grip changes to promote hand comfort on long drives, and rim grip changes to enhance driver performance in varying conditions.

Conventional steering wheel rim grip maintains a constant size, shape, hardness, and texture regardless of user-preference, user-state, user driving style, or driving environment. Some drivers customize steering wheel size, shape, hardness, and/or texture by purchasing an after-market steering wheel rim cover. However, these rim covers are only suitable for the preferences of the driver who purchased the rim cover.

SUMMARY

It is an object of the present disclosure to provide a steering wheel for a vehicle comprising: i) a hub adapted to be mounted on a steering column of a vehicle; ii) a rim coupled to the hub; iii) a rim material covering at least a part of the rim; iv) at least one bladder disposed between the rim and the rim material; v) a fluid pump configured to inflate and to deflate the at least one bladder; and vi) a control module coupled to at least one vehicle sensor and configured to control the operation of the fluid pump.

In one embodiment, the fluid pump transfers a liquid to inflate and to deflate the at least one bladder.

In another embodiment, the fluid pump transfers a gas to inflate and to deflate the at least one bladder.

In still another embodiment, the control module inflates and deflates the at least one bladder in order to modify a steering wheel grip by changing at least one of size, shape, hardness and texture of the steering wheel rim.

In yet another embodiment, the control module modifies the steering wheel grip to adjust to at least one of: i) a driver need, ii) a hand size, iii) a driver preference, or iv) a driving environment.

In a further embodiment, the control module is configured to identify a driver using the at least one vehicle sensor and is further configured to modify the steering wheel grip according to an identity of the driver.

In a still further embodiment, the control module modifies the steering wheel grip according to a stored driver preference associated with the identity of the driver.

In a yet further embodiment, the control module modifies the steering wheel grip according to a driver state or driving style.

In one embodiment, the driver state or driver style comprises at least one of hand size, hand location, grip strength, galvanic skin response, heart rate, and body temperature.

In another embodiment, the control module modifies the steering wheel grip according to a driving environment.

In a further embodiment, the driving environment comprises at least one of traffic, weather, road type, road conditions, and vehicle type.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
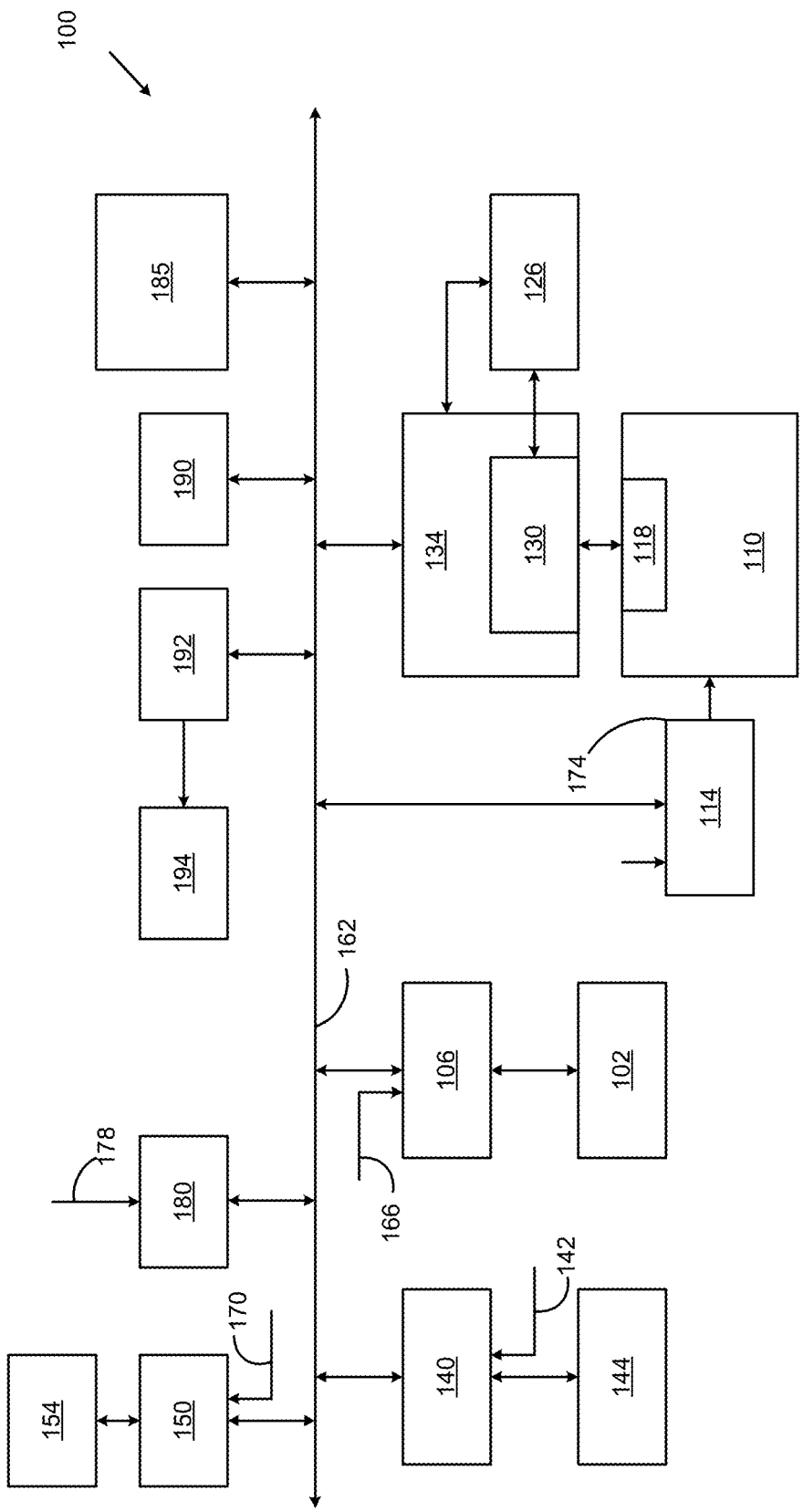
FIG. 1 is a functional block diagram of an exemplary vehicle system 100 that includes an adaptive steering wheel according to an embodiment of the present disclosure.

The present disclosure describes an adaptive system that dynamically changes the steering wheel grip size, shape, hardness, or texture based on individual differences, individual preferences, or changes in the driving environment (or driving context). The steering wheel rim material integrates one or more inflatable bladders that inflate or deflate as required to change rim grip size, shape, hardness, or texture.

A conventional steering wheel rim is a static design selected to meet the needs of all drivers (or users) in all driving contexts. This disclosed system and method change the steering wheel rim grip to meet different driver needs, hand sizes, preferences, and/or driving environments. The steering wheel may dynamically change the rim cross-section diameter, shape, hardness and/or texture using one or more inflatable bladders integrated into the steering wheel rim material. The driver may manually select the steering wheel rim characteristics or a vehicle control system may modify these characteristics based on driver (or user) state, driving style, and/or driving environment. The vehicle control system modifies rim diameter, shape, hardness, and/or texture to increase driver performance or to enhance driver hand comfort on long drives.

In an advantageous embodiment, the disclosed apparatus implements a method that: i) identifies a driver (or user); ii) implements user-preferences in steering wheel rim size, shape, hardness and texture; and iii) determines user-state and/or driving style (e.g., hand size, hand location, grip strength, galvanic skin response, heart rate, temperature, etc.). The method also: iv) determines driving environment, (e.g., traffic, weather, road type/conditions, vehicle, etc.); and v) adapts the steering wheel rim characteristics to enhance driver performance and/or promote comfort.

The disclosed apparatus includes driver-identification sensors (e.g., facial recognition, presence of key fob, other biometrics), steering wheel sensors (e.g., optical, force, capacitive, galvanic skin response, heart rate, temperature, etc.), and driving environment sensors (e.g., GPS, satellite, vehicle-to-vehicle (V2V), internet, vehicle speed, etc.). Multiple inflatable bladders of different sizes may be integrated into the steering wheel rim material around a periphery of the steering wheel. The apparatus includes an advanced computing platform, an algorithm, and a control unit to inflate or deflate the appropriate bladders for a given driver, driver-state, driving style, and driving environment.

The apparatus enables the driver to adjust manually the rim diameter, shape, hardness, and texture with control buttons. The driver may initially set preferences (vehicle identifies user with key fob, facial recognition, etc.) and the vehicle subsequently adjusts the steering wheel rim parameters to previously saved preferences. The driver may select steering wheel rim characteristics, including steering wheel rim cross-section diameter (e.g., thin, medium, thick), steering wheel rim hardness (e.g., spongy, medium, rigid), steering wheel rim texture (e.g., smooth, fine, coarse), and steering wheel rim cross-section shape (e.g., normal, bulges, grips). The disclosed apparatus may further modify these characteristics based on user-state and/or driving environment. Modifications may increase driver hand comfort or enhance driving performance.

FIG. 1 is a functional block diagram of an exemplary vehicle system 100 that includes an adaptive steering wheel according to an embodiment of the present disclosure. While a vehicle system for a manually driven hybrid vehicle is shown and described, the present disclosure is also applicable to autonomously driven vehicles and to all-electric vehicles. The present disclosure may also be applicable to non-automobile implementations, such as trains, boats and aircraft.

An engine 102 combusts an air/fuel mixture to generate drive torque. An engine control module (ECM) 106 controls the engine 102 based on one or more driver or vehicle inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 100 may include one or more electric motors. For example, an electric motor 118 may be implemented within the transmission 110 as shown in the example of FIG. 1A. An electric motor can act as either a generator or as a motor at a given time. When acting as a generator, an electric motor converts mechanical energy into electrical energy. The electrical energy may charge a battery 126 via a power control device (PCD) 130. When acting as a motor, an electric motor generates torque that supplements or replaces torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel 194 within the vehicle and/or steering commands from one or more vehicle control modules. A steering wheel angle sensor (SWA) monitors rotational position of the steering wheel 194 and generates a SWA 142 signal based on the position of the steering wheel. As an example, the steering control module 140 may control vehicle steering via an EPS motor 144 based on the SWA 142 signal. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 that may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

According to an exemplary embodiment of the present disclosure, the vehicle system 100 further comprises an advanced computing module 185, a sensors module 190, a fluid pump 192, and a steering wheel 194 that includes one or more inflatable bladders. The fluid pump 192 may pump air (pneumatic) or a liquid (hydraulic), such as water or oil. The fluid pump 192 is controlled by the advanced computing module 185, which selectively inflates and deflates the inflatable bladders of the steering when 194 according to the principles of the present disclosure.

The sensors module 190 may include a plurality of sensors distributed through the vehicle system 100 that gather important information. The sensor information may include on-board sensor inputs, such as a steering wheel capacitive sensor, a steering wheel force sensor, a temperature sensor, a facial recognition sensor, a heart rate sensor, and a key fob. The sensors module 190 may also include a vehicle speed sensor, a steering wheel angle sensor data, brake status data, LiDAR system data, radar data, camera images, accelerometer data, engine temperature and RPM, and the like to determine the speed, direction, and location of the vehicle system 100. The sensor information also may include off-board sensor inputs, such as GPS data, traffic report data, satellite data, vehicle-to-vehicle data, a roadmap database, weather reports, and cellular data.

The advanced computing module 185 comprises a high performance computing platform that controls many of the higher order functions and lower order functions of the vehicle system 100. In a typical implementation, the advanced computing module 185 may comprise a microprocessor and an associated memory. The advanced computing module 185 executes a kernel program that controls the overall operation of the advanced computing module 185. According to the principles of the present disclosure, the advanced computing module 185 controls the operation of the fluid pump 192 in order to inflate and deflate the bladders in the steering wheel 194.

Figure 2:
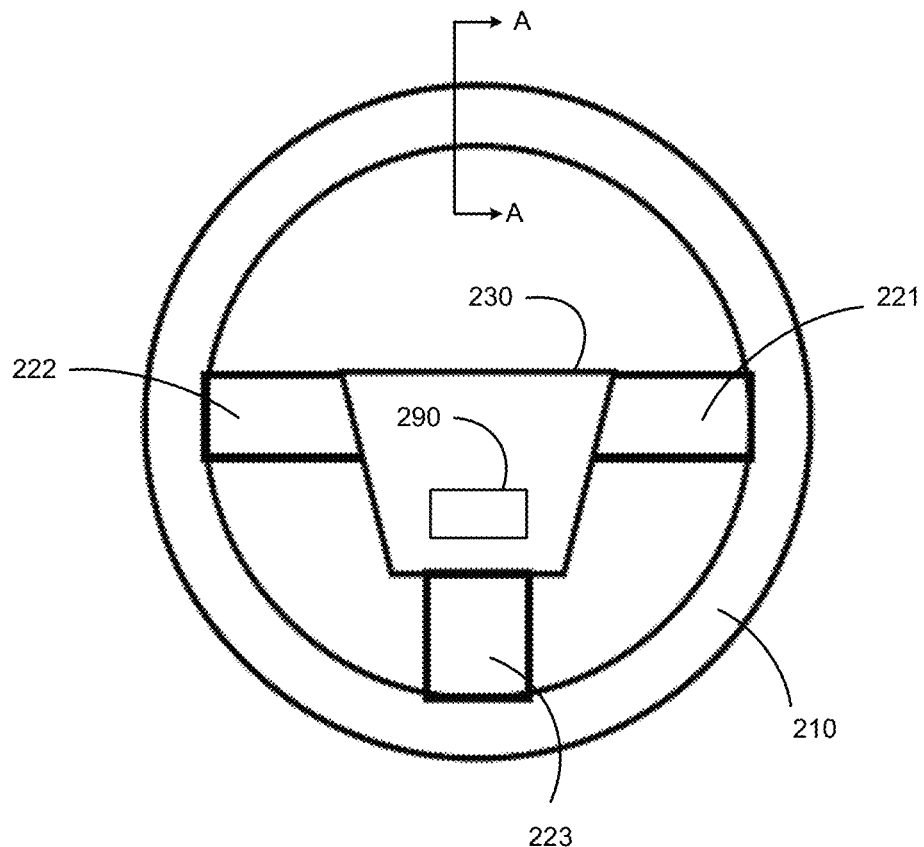
FIG. 2 is a diagram of an adaptive steering wheel according to an embodiment of the present disclosure.

FIG. 2 is a diagram of an adaptive steering wheel 194 according to an embodiment of the present disclosure. The steering wheel 194 comprises a steering wheel rim 210, a plurality of spokes 221-223, and a hub 230. The hub 230 attaches to, or mounts on, a steering column (not shown). According to an advantageous embodiment, the fluid pump 192 and a fluid reservoir (not shown) may be disposed within the hub 230. Fluid lines (not shown) within the spokes 221-223 carry the air or liquid from the fluid pump 192 to the bladders in the rim 210. Different cross-sectional views A-A of the rim 210 are shown in the subsequent figures.

A rim material, such as rubber or a fabric, covers all or portions of the steering wheel rim 210. One or more inflatable bladders of different sizes are disposed within the rim material around a periphery of the steering wheel 194. According to an exemplary embodiment, the hub 230 further comprises one or more manual pump controls 290, which the driver may use to control manually the inflation and deflation of the bladders in the rim 210.

Figure 3A:
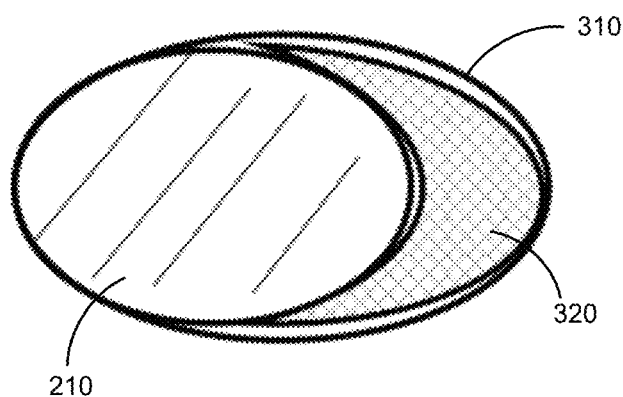
FIG. 3A is a cross-sectional view of an adaptive steering wheel with an inflated ridge bladder according to an embodiment of the present disclosure.
Figure 3B:
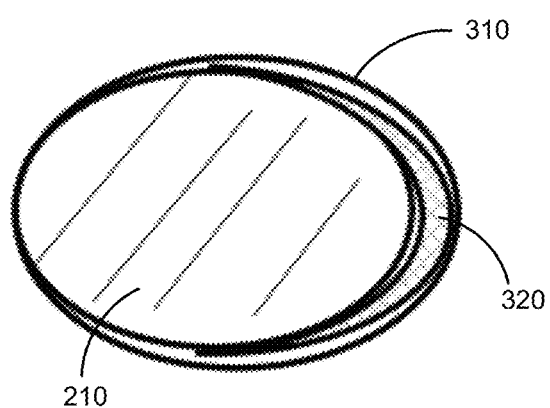
FIG. 3B is a cross-sectional view of an adaptive steering wheel with a deflated ridge bladder according to an embodiment of the present disclosure.

FIG. 3A is a cross-sectional view A-A of an adaptive steering wheel 194 with an inflated ridge bladder 320 according to an embodiment of the present disclosure. FIG. 3B is a cross-sectional view AA of the adaptive steering wheel 194 with a deflated ridge bladder 320 according to an embodiment of the present disclosure. A rim material 310 wraps or covers the rim 210 and the ridge bladder 320 is situated between the rim 210 and the rim material 310. The shading pattern in the ridge bladder 320 indicates the air or fluid that fills the ridge bladder 320. Inflating the ridge bladder 320 causes one or more ridges to form in the rim material 310. In one embodiment, the ridge bladder 320 may create a long spiraling ridge that wraps multiple times around the rim 210. In another embodiment, the ridge bladder 320 may form multiple separate rings around the rim 210. The ridges enhance the grip of the driver on the steering wheel 194.

Figure 4A:
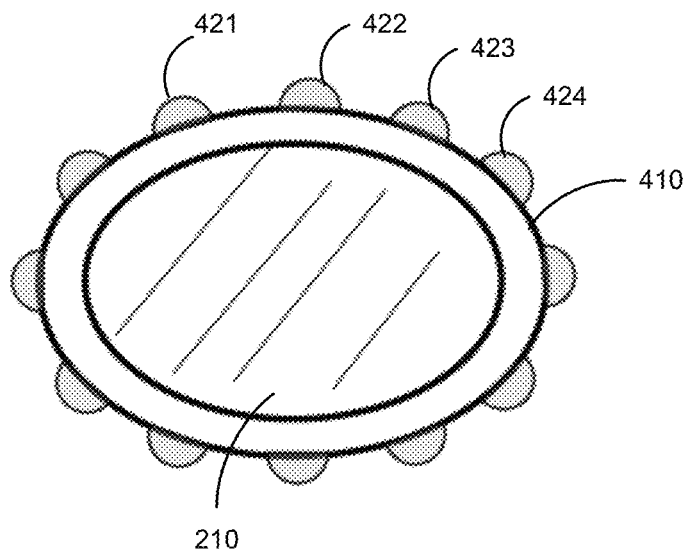
FIG. 4A is a cross-sectional view of an adaptive steering wheel with an inflated texture bladder according to an embodiment of the present disclosure.
Figure 4B:
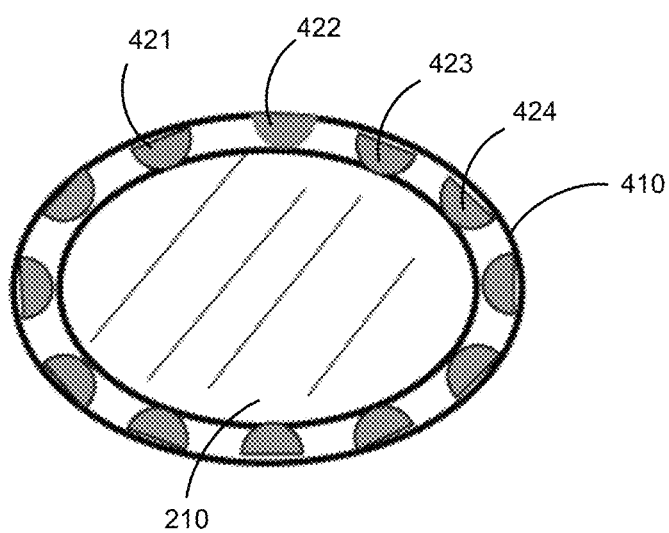
FIG. 4B is a cross-sectional view of an adaptive steering wheel with a deflated texture bladder according to an embodiment of the present disclosure.

FIG. 4A is a cross-sectional view A-A of an adaptive steering wheel 194 with an inflated texture bladder according to an embodiment of the present disclosure. FIG. 4B is a cross-sectional view A-A of an adaptive steering wheel with a deflated texture bladder according to an embodiment of the present disclosure. A rim material 410 wraps around or covers the rim 210. The texture bladder comprises a plurality of dimples (e.g., exemplary dimples 421-424) that form in the rim material 410 when air or fluid pumps into the rim material 410. The dimples 421-424 "pop out" or extend from the rim material 410 when the rim material 410 is inflated (FIG. 4A) and sink back or withdraw into the rim material 410 when the rim material 410 is deflated (FIG. 4B). The dimples 421-424 enhance the grip of the driver on the steering wheel 194.

Figure 5A:
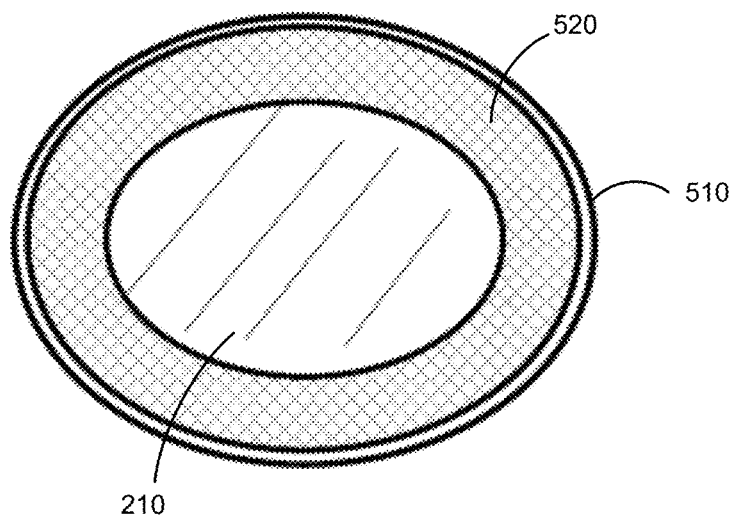
FIG. 5A is a cross-sectional view of an adaptive steering wheel with an inflated grip size bladder according to an embodiment of the present disclosure.
Figure 5B:
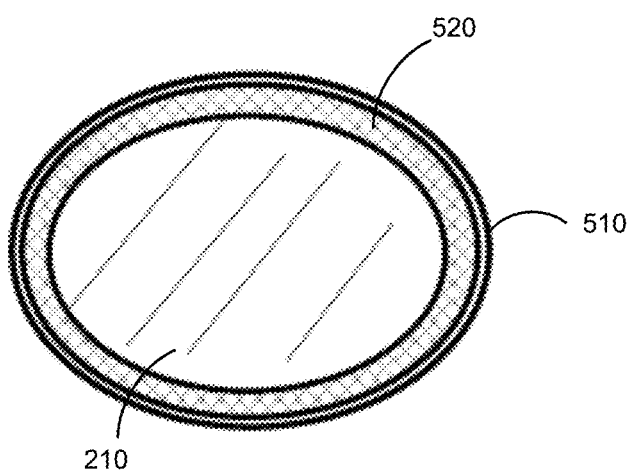
FIG. 5B is a cross-sectional view of an adaptive steering wheel with a deflated grip size bladder according to an embodiment of the present disclosure.

FIG. 5A is a cross-sectional view A-A of an adaptive steering wheel 194 with an inflated grip size bladder 520 according to an embodiment of the present disclosure. FIG. 5B is a cross-sectional view A-A of an adaptive steering wheel 194 with a deflated grip size bladder 520 according to an embodiment of the present disclosure. A rim material 510 wraps or covers the rim 210 and the grip size bladder 520 is situated between the rim 210 and the rim material 510. The shading pattern in the grip size bladder 520 indicates the air or fluid that fills the grip size bladder 520. Inflating or deflating the grip size bladder 520 simply causes the rim 210 to feel thicker or thinner, respectively. The thicker rim 210 enhances the grip of the driver on the steering wheel 194.

Figure 6:
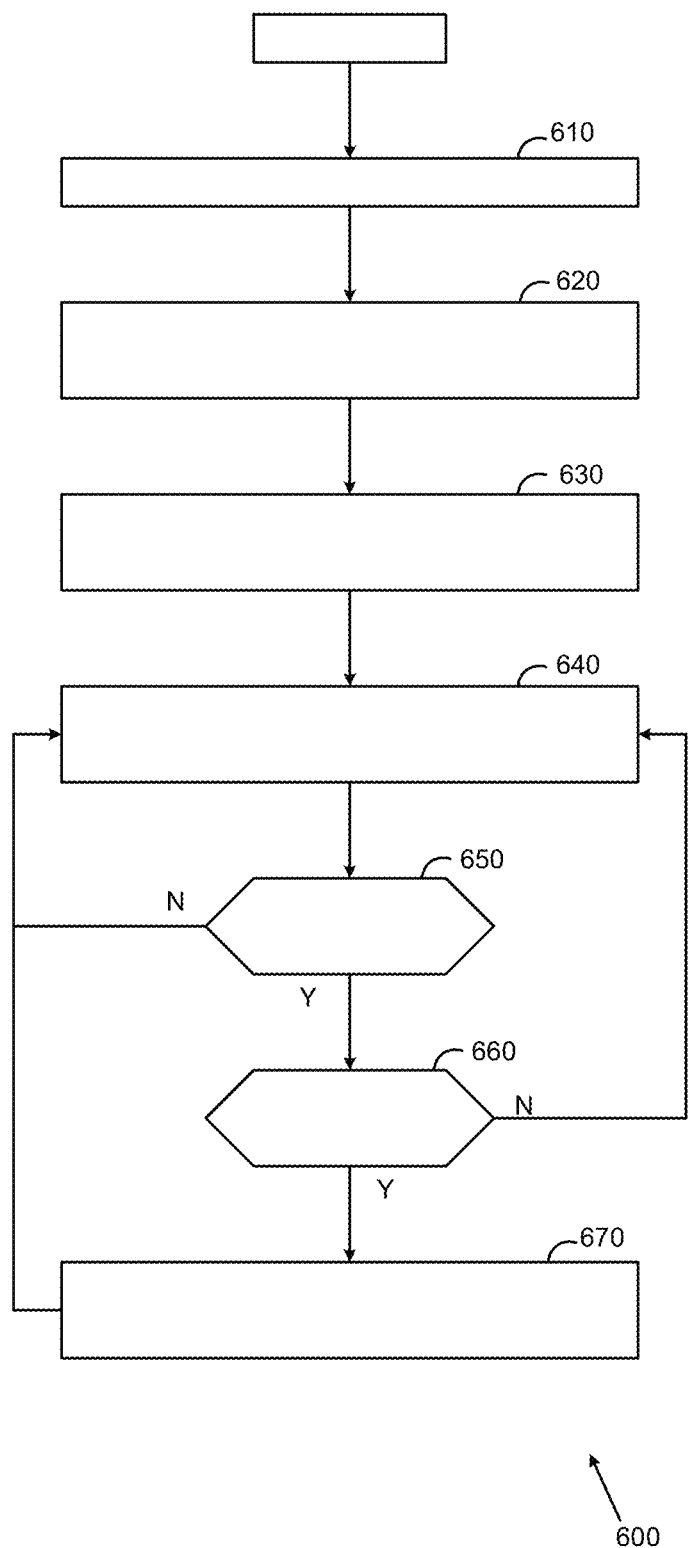
FIG. 6 is a flow diagram of the operation of the adaptive steering wheel according to an embodiment of the present disclosure.

FIG. 6 is a flow diagram of the operation of the adaptive steering wheel 194 according to an embodiment of the present disclosure. In 610, the advanced computing module 185 in the vehicle system 100 determines the identity of the driver. The advanced computing module 185 may identify the driver using one or more driver-identification sensors, including but not limited to a facial recognition system or other biometric sensors, a key fob, a keypad and password, and the like.

In 620, the advanced computing module 185 adjusts the steering wheel rim 210 according to the preferences of the identified driver. The advanced computing module may adjust for size, shape, texture, hardness, and the like. Optionally, in 630, the driver also may adjust steering wheel rim size, shape, texture, and/or hardness using the manual pump controls 290. In 640, the advanced computing module 185 monitors driver state and driving environment. For example, the advanced computing module 185 may determine the user-state or driving style, such as hand size, hand location on the rim 210, grip strength, galvanic skin response, heart rate, temperature, and the like. The advanced computing module 185 may also determine a driving environment, such as traffic, weather, road type, road conditions, vehicle type, and the like.

In 650, the advanced computing module 185 determines if the driver state and/or environment changed or if the driving environment changed. If NO in 650, the advanced computing module 185 continues in 640 to monitor the driver state and driving environment. If YES in 650, the advanced computing system 185 in 660 determines if the detected changes require a change in the steering wheel rim 210. If NO in 660, the advanced computing module 185 continues in 640 to monitor the driver state and driving environment. If YES in 660, the advanced computing module 185 in 670 adjusts one or more of the steering wheel rim size, shape, texture, or hardness.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A steering wheel for a vehicle comprising:
a hub adapted to be mounted on a steering column of the vehicle;
a steering wheel rim coupled to the hub;
a rim material covering at least a part of the steering wheel rim;
at least one bladder disposed between the steering wheel rim and the rim material;
a fluid pump configured to inflate and to deflate the at least one bladder;

at least one steering wheel sensor configured to sense indicators of at least one of hand size, hand location on the steering wheel rim, galvanic skin response, heart rate, and body temperature; and a control module coupled to the at least one steering wheel sensor, wherein the control module is configured to (i) control operation of the fluid pump and (ii) inflate and deflate the at least one bladder in order to modify a steering wheel grip by changing at least one of size, shape, hardness and texture of the steering wheel rim, and wherein the control module is configured to modify the steering wheel grip to at least one of a driver need and a driver preference in response to the indicators sensed by the at least one steering wheel sensor, wherein, to modify the steering wheel grip to at least one of the driver need and the driver preference, the control module is configured to adjust multiple inflatable bladders having different sizes to form one of (i) a ridge that wraps multiple times around the steering wheel rim and (ii) multiple, separate rings around the steering wheel rim.

2. The steering wheel as set forth in claim 1, wherein the fluid pump transfers a liquid to inflate and to deflate the at least one bladder.

3. The steering wheel as set forth in claim 1, wherein the fluid pump transfers a gas to inflate and to deflate the at least one bladder.

4. The steering wheel as set forth in claim 1, wherein the control module is configured to identify a driver using at least one vehicle sensor and is further configured to modify the steering wheel grip according to an identity of the driver.

5. The steering wheel as set forth in claim 4, wherein the control module modifies the steering wheel grip according to a stored driver preference associated with the identity of the driver.

6. The steering wheel as set forth in claim 5, wherein the control module modifies the steering wheel grip according to a driving style.

7. The steering wheel as set forth in claim 6, wherein driving style comprises grip strength.

8. The steering wheel as set forth in claim 5, wherein the control module modifies the steering wheel grip according to a driving environment.

9. The steering wheel as set forth in claim 8, wherein the driving environment comprises at least one of traffic, weather, road type, road conditions, and vehicle type.

10. The steering wheel as set forth in claim 5, wherein the at least one vehicle sensor comprises at least one of a facial recognition system, a key fob detector, and a driving environment sensor.

11. A method of controlling a steering wheel comprising a steering wheel rim, a rim material covering at least a part of the steering wheel rim, and at least one bladder disposed between the steering wheel rim and the rim material, the method comprising:

sensing, using at least one steering wheel sensor, indicators of at least one of hand size, hand location on the steering wheel rim, galvanic skin response, heart rate, and body temperature; and modifying a steering wheel grip by one of:
inflating the at least one bladder; and
deflating the at least one bladder,
wherein modifying the steering wheel grip includes modifying the steering wheel grip to at least one of a driver need and a driver preference in response to the indicators sensed by the at least one steering wheel sensor, and
wherein, to modify the steering wheel grip to at least one of the driver need and the driver preference, the method further comprises adjusting multiple inflatable bladders having different sizes to form one of (i) a ridge that wraps multiple times around the steering wheel rim and (ii) multiple, separate rings around the steering wheel rim.

12. The method as set forth in claim 11, wherein modifying the steering wheel grip comprises transferring a liquid to inflate and to deflate the at least one bladder.

13. The method as set forth in claim 11, wherein modifying the steering wheel grip comprises transferring a gas to inflate and to deflate the at least one bladder.

14. The method as set forth in claim 11, wherein modifying the steering wheel grip comprises changing at least one of size, shape, hardness and texture of the steering wheel rim.

15. The method as set forth in claim 11, further comprising:
identifying a driver using the at least one steering wheel sensor; and
modifying the steering wheel grip according to an identity of the driver.

16. The method as set forth in claim 15, wherein modifying the steering wheel grip comprises modifying the steering wheel grip according to a stored driver preference associated with the identity of the driver.

17. The method as set forth in claim 16, further comprising modifying the steering wheel grip according to a driver state or driving style.

* * * * *